United States Patent [19]

Navarro

[11] 4,078,667

[45] Mar. 14, 1978

[54] CONTROL SYSTEM FOR MECHANICAL HANDLING INSTALLATION

[76] Inventor: José Navarro, 246 Bld Gabriel Peri, Noisy-le-Sec, France

[21] Appl. No.: 651,904

[22] Filed: Jan. 23, 1976

[30] Foreign Application Priority Data

Jan. 31, 1975 France ................................ 75 03015

[51] Int. Cl.[2] ............................................ B65G 43/00

[52] U.S. Cl. ................................ 212/14; 73/432 AD; 116/124 R; 200/56 R; 214/1 CM

[58] Field of Search ................ 214/1 R, 1 CM, 1 BB, 214/1 BT; 212/1, 10-16; 116/124 R, 124 F; 73/432 AD; 200/56 R

[56] References Cited

U.S. PATENT DOCUMENTS

| | | | |
|---|---|---|---|
| 2,822,094 | 2/1958 | Greer | 214/1 CM X |
| 3,107,796 | 10/1963 | Eisele | 214/15 R |
| 3,365,560 | 1/1968 | Lee | 214/1 CM X |
| 3,488,036 | 1/1970 | Feger et al. | 116/124 R X |

*Primary Examiner*—Frank E. Werner
*Attorney, Agent, or Firm*—Donald D. Jeffery

[57] ABSTRACT

The control system is of the type which is manually controlled by a suspended control box. Directional errors arise when the control box is twisted relative to the installation being controlled since the controls on the control box no longer have their original meaning. A direction indicating mechanism is therefore provided which comprises an indicating member mounted within the control box and visible to an operator, which indicating member is held against rotation relative to the installation but is able to rotate relative to the control box itself.

13 Claims, 3 Drawing Figures

66
64
24
16
22
20
70
58
14
62
60
68
18
10

70
60
56
62
58
78
72
50
76
74
54
68
46
36b
12
40
26
32
28
30

CONTROL SYSTEM FOR MECHANICAL HANDLING INSTALLATION

The present invention relates to a control system for controlling an installation having an operating member which is movable along several discrete axes at least one of which is horizontal. The invention is concerned with a system of the type which comprises a control box which is suspended by a flexible connecting cable from a junction box. The installations to be controlled are those such as material-handling equipment, machine tools or other equipment, which have an operating member in the form of a lifting hook, machining tool, etc.

Present-day control systems incorporating a moving control station are mainly of the type comprising a control box which is suspended by a flexible connecting cable from a junction box (usually movable on a rail) and which, for each axis of movement of the operating member has at least two differently marked control members for causing displacement of the operating member in one or other direction along a corresponding axis.

In some systems, the control members on the suspended control box take the form of push-buttons or rocker-type finger-keys which each carry a mark such as an arrow or a letter suitable for indicating to the operator both the axis of travel and the direction in which the operating member will be moved if he presses the control member in question.

In the case for example of a gantry wherein the operating member (a lifting hook) can be moved along at least three axes, namely along the vertical axis (lifting) and along two horizontal axes (translation and sideways), the control box will have three pairs of differently marked control members marked respectively:

up-down : for "lifting"
forward-back : for "translation", and
left-right : for "sideways"

It may however happen that the operator, during the course of his movements and depending upon the manipulation requirements, has to turn the control box about its own axis, thereby twisting the flexible connecting cable.

When the control box is rotated in this way the marks carried by the control members lose their original meaning. Thus, if the box is rotated through 180°, the directions of movement (as seen by the operator) of the operating member along each of the horizontal axes of movement will be the reverse of those indicated on the box compared with the control members corresponding to this direction. In the case of rotation through 90° or 270°, the "translation" axis and the "sideways" axis will replace each other.

Such changes in the meaning of the reference marks can result in confusion which can cause damage to equipment and personal injury. It is for this reason that, in practice, and when the installation permits it, the operator carries out a test which consists in sending a control pulse which enables him to check the axis and direction of the movement controlled by the pulse. These check tests (known as "strumming") are detrimental to the installation which is repeatedly started up at a frequency often greater than the number of starts per hour envisaged by the manufacturer, and can lead to premature deterioration of the installation and useless expenditure of energy.

To avoid the above-mentioned disadvantages, particularly when use is made of control boxes comprising a single control member movable in several directions, it has been proposed to use non-rotatable connecting cables designed to hold the box so that it always faces in one direction. These cables are heavy, occupy considerable space and, by their very nature, prevent the control box from rotating about its own axis, which ability to rotate may, in certain cases, prove to be desirable and in some instances indispensable. Manipulation of the box becomes difficult and fatiguing in view of the relative rigidity of the cable and of its weight.

The present invention seeks to provide a control system having a suspended control box that does not suffer from the disadvantages mentioned above.

According to the invention, there is provided a control system for controlling an installation having an operating member which is movable along several discrete axes one at least of which is horizontal, said control system incorporating a control box which is suspended by a flexible connecting cable from a junction box, said control box comprising:

for each axis of movement of the operating member, two differently marked control members each of which is manually operable to cause displacement of the operating member in a respective direction along that axis; and a direction indicating mechanism for providing a visible indication of the horizontal orientation of the operating member irrespective of the orientation of the control box, said indicating mechanism having a reference element which is movable relative to the control box but is held against rotation relative to the junction box by connection means associated with the junction box, and a visible element moveably associated with said reference element.

It will be appreciated that, by providing the control box with a direction indicating mechanism having a reference element whose angular position relative to the junction box is fixed, it is possible to provide the operator with a correct indication of the axis of movement of the operating member that is achieved by actuating each control element, irrespective of the direction in which the box faces.

In a preferred embodiment of the invention the visible element comprises a substantially horizontal rotatable disc mounted within the control box, which disc is connected to the reference element and carries on its upper surface, which is visible at least in part from the exterior of the control box, a mark allotted to the or each horizontal axis of movement of the operating member, each mark corresponding to a respective one of the differently marked control members that relate to this axis, the relative position of the mark informing the operator of the direction of movement of the operating member which would occur if he were to operate that control member.

Preferably the control box consists of a casing provided with a number of said control members and with a hand grip secured to the lower portion of the casing, at least some of said control members being mounted on the casing and grouped in a fan-like arrangement around the grip to enable them to be actuated by the thumb of the operator holding the grip.

With such geometry of the control box, it will be appreciated that, using only one hand, the operator is able to hold the box firmly to actuate in turn the various control members disposed in a fan-like arrangement around the grip of the box, without releasing his hold. The position and the angle of slope of this grip also create the best conditions for avoiding unnecessary fatigue.

In order that the invention may be better understood, an embodiment thereof will now be described by way of example only and with reference to the accompanying drawings in which.

Figure 1:
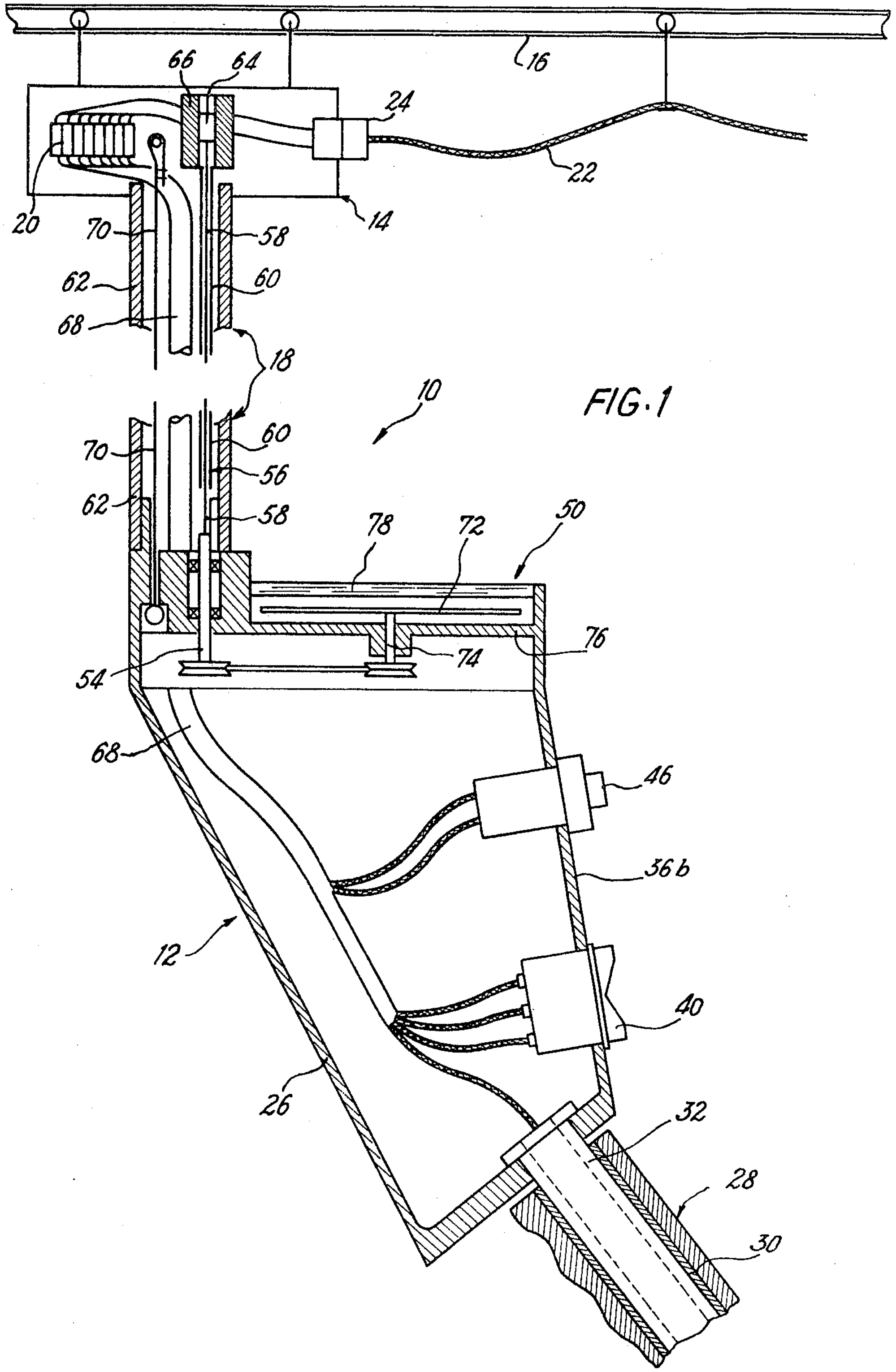
FIG. 1 is a diagrammatic and fragmented sectional view of a control system in accordance with the invention.

An embodiment of the control system of this invention is shown in FIG. 1 under reference 10. The control system is designed to control the movement of a particular apparatus (not shown) from a moving station. Examples of such apparatus are a material-handling installation of the moving tackle type, a gantry, a hopper charging system, a hoisting apparatus, or a machine tool. For the purposes of the present description, the apparatus controlled is a crane gantry having an operating member in the form of a lifting hook actuated by a pulley mounted on a carriage adapted to run on a bridge which is itself movable on rails. However, it is to be understood that the control system of the invention is not limited to this particular application.

The control system 10 comprises a control box 12 supported from a junction box 14 which is mounted to move on a straight rail 16. When fitted, the rail 16 extends parallel to the rails (not shown) on which the gantry (also now shown) can travel backwards and forwards. The control box 12 is supported below junction box 14 by a flexible multi-core connecting cable 18 having a flexible sheath 62 through which the electrical (or hydraulic or pneumatic) signals from the control box 12 are transmitted to a terminal strip 20 provided in the junction box 14. The terminals on the strip 20 are connected to the gantry driving mechanism (not shown) by way of a conventional flat flexible cable 22 connected to the junction box 14 by a multi-pin plug 24.

The control box 12 consists of a casing 26, having the general shape of an inverted inclined truncated pyramid, the wider end of which is substantially horizontal, and of an inclined grip 28 of elongate form secured to the lower part of the casing 26.

The grip 28 is advantageously made of a moulded plastics material or of rubber and is solidly connected to a tube 30 adapted to turn about a hollow shaft 32, secured in any suitable manner to the smaller narrower end of the casing 26. In use, the shaft 32 is normally inclined to the horizontal at an angle of between 0° and 80° approximately, and preferably of the order of 40° so as to enable the grip 28 to be firmly grasped by the operator, with his forearm and arm in the most comfortable position, account being taken of the height at which the box 12 is hung. The lower end of the grip (not visible in FIG. 1) may contain a control member (not shown) such as contact-locking device or a push-button for operating a warning device.

The shorter side of the casing 26, is divided into three mutually inclined faces 36*a*, 36*b* and 36*c* arranged as shown. A number of control members are provided on the faces 36*a*, 36*b* and 36*c* for enabling the operator to control the various movements of the gantry. In the arrangement illustrated these control members consist of:

- three 3-way slide or rocker switches 38, 40 and 42 disposed in a fan-like arrangement around the grip 28 to control respectively the displacement of the lifting hook in one or other direction along each of its possible lines of movement,
- a contact locking device or cut-off 44 for starting up the apparatus or putting it out of operation, and
- one or more push-buttons or multi-way rotatable switches 46 and 48 for controlling certain secondary displacements of the lifting hook, for example rotation of the hook about its own axis, or for accelerating or slowing down a particular movement.

In the present example illustrating the use of the control box 12 with a gantry, the switch 38 may control the movement of the carriage on the bridge in one direction or the other to effect sideways movement D of the lifting hook. Similarly the switch 40 may control the operation of the pulley (upwards and downwards), to effect lifting movement L of the lifting hook, and the switch 42 may control the movement of the bridge on its rails in one direction or the other to effect translatory movement T of the lifting hook.

The finger-key of each of the rocker switches 38, 40 and 42 consists of two elements which are fixedly connected to each other and positioned opposite each other and which are each inclined such that pressure on a respective element of each key causes an appropriate displacement of the lifting hook in a respective one of two opposite directions. The elements forming each finger-key are differently marked, at least one the elements carrying a mark such as an arrow for enabling the operator to select in accordance with the visible indication provided (see below), that element of the finger-key that controls the displacement of the lifting hook in the required direction along the selected line of movement.

Each of the switches 38, 40 and 42 is of the impulse-actuation type (one stable position only) or is of the fixed-position type (three stable positions). In a modified form, each of the switches 38, 40 and 42 is replaced by two superposed and differently marked push-buttons.

Ribs (not shown) may be provided along the lines of contact of the faces 36*a*, 36*b* and 36*c* to protect the various control members and to prevent simultaneous actuation of two adjacent rocking finger-keys. Further the fan-like arrangement of the switches 38, 40 and 42 and the rotatable mounting of the inclined grip 28 enable the operator, by using only one hand, to obtain a firm hold on the grip and to press his thumb on any one of the elements forming the finger-keys without releasing his hold on the grip.

A cluster 68 of electrical conductors (or hydraulic or pneumatic pipes) are provided within the sheath 62 for the purpose of connecting the various control members in the box 12 to the terminal strip 20.

The control box 12 is completed by a direction indicating mechanism generally indicated at 50 which is adapted to provide the operator with a visible indication which enables him to select, for each direction along a line of movement, the correct element of the finger-key which will control the displacement of the lifting hook in the required direction along the line of movement in question.

The direction indicating mechanism 50 comprises a movable reference element in the form of a substantially vertical spindle 54 mounted to rotate in the casing 26 with the aid of any suitable means such as ball-bearing units. Orientation in a horizontal plane of the spindle 54 (i.e. the angular position of the spindle about its own axis) is maintained by virtue of its attachment to a connection means 56 which extends upwards to the junction box 14. The connection means 56 comprises a non-twist metal cable 58 (also known as a non-kinking cable) fitted in a flexible sheath 60 housed in the outer sheath 62 of the connecting cable 18. The lower end of the cable 58 is attached by suitable means to the spindle 54, and its upper end is provided with a small cylindrical piston 64 which has a non-circular cross section and is mounted to slide in a cylindrical guide 66 of complementary shape provided in the junction box 14. With an arrangement of this kind it will be appreciated that the orientation of the spindle 54 remains unchanged irrespective of any twist experienced by the cable 18. The ability of the piston 64 to slide within the guide 66 enables the length of the connection means 56 to be increased when the cable 18 is subjected to twisting.

In a modified arrangement (not shown), the connection means 86 comprises a positioning servo-mechanism of known type such as a selsyn synchro-transmission, the output member of which (associated with the spindle 54) is held, by virtue of the gap between predetermined electro-magnetic fields, in the same direction as the input member which is itself mounted to extend in a pre-determined direction. This modified form may be used particularly when the rail 16 is not straight but curved.

The sheath 62 of the connecting cable 18 also encloses a suspension cable 70, the ends of which are connected by suitable means to the junction box 14 and the casing 26 to support the main part of the weight of the box 12. The diameter of the sheath 62 is such that a degree of clearance is possible between the suspension cable 70, the cluster of conductors 68 and the sheath 60. This enables a certain amount of twisting motion, as much as several turns, to be imparted to the cable 16 without damage.

The indicating mechanism 50 is completed by a plarar disc 72 fixedly connected to a substantially vertical spindle 74 mounted to rotate in the wider upper end 76 of the casing 26. The spindle 74 is connected to the spindle 54 through a mechanical transmission means having a 1/1 reduction ratio. This ensures that the orientation of the horizontal disc 72 also remains unaltered irrespective of any twisting motion experienced by cable 18.

Figure 3:
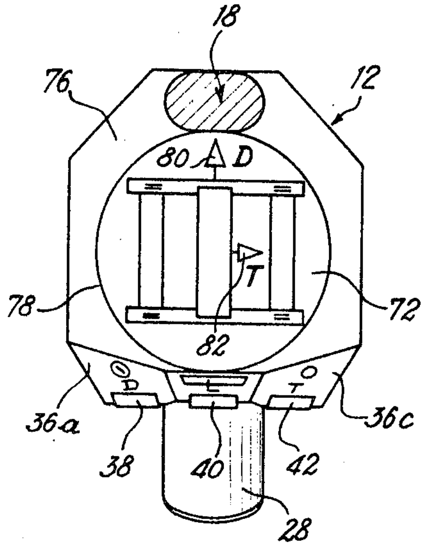
FIG. 3 is a plan view of the control box shown in FIG. 2.

The upper face of the disc 72 is visible, at least in part, from the exterior through a round protective transparent cover 78 secured to the wider end 76 of the casing 26. As shown in FIG. 3, the upper face of disc 72 carries, for each of the horizontal directions of displacement of the lifting hook (sideways D and translatory T), a mark such as an arrow 80 or 82 which corresponds to the mark on one of the two elements of the finger-key relating to the horizontal direction in question. The first arrow 80, opposite to the letter D, indicates the sideways direction and the second arrow 82, at right-angles to the first and opposite the letter T, indicates the translatory direction.

As shown in FIG. 3, the disc 72 also carries a very simplified picture showing a plan view of the installation in this case, a crane gantry to be controlled. With such a picture, taking into account the constant orientation of the disc 72, the operator, even in the absence of the letters D and T, can find the finger key corresponding to the correct switch 38, 40 or 42 that relates to the direction in which he wishes to displace the lifting hook.

In a further embodiment of the invention (not shown) the direction indicating mechanism 50 comprises, for each horizontal direction, at least one element (such as a wheel) which carries on its periphery a certain number of reference marks (such as different orientation arrows), which can each be brought in turn in front of a transparent cover located on one of the elements of the finger-keys, the latter then having no disconnection or function sign as regards the direction in which control is to be carried out. Thus, by simply reading the reference marks appearing behind the covers, the operator will press that element of a finger-key situated opposite the reference mark corresponding to the line of movement and the direction that are required.

It will also be appreciated that the indicating mechanism 50 could be of other forms. The only important factor is that this means should be capable of being readily connected to the reference element (i.e. spindle 54) and that, as a function of its position in the casing 26, it should be capable of providing the operator with one or more visible indications which enable him to select immediately that element of a finger-key that will bring about the displacement of the lifting hook along the required horizontal line of movement and in the required direction, irrespective of the direction in which the operator causes the box 12 to face.

Figure 2:
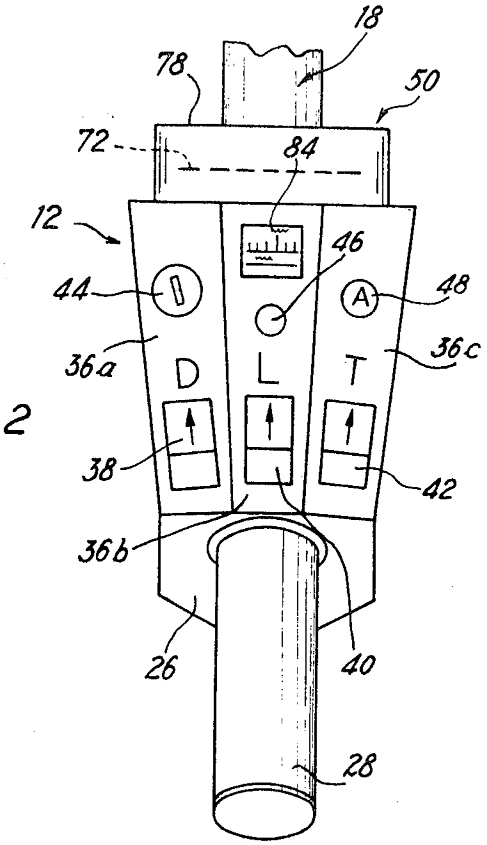
FIG. 2 is a front view of the control box of the control system of FIG. 1.

As shown in FIG. 2, the control box also comprises a transparent cover behind which moves a display means 84 (wheel, disc, strip, counter etc.) which is actuated as a function of a variable quantity associated either with the position of the lifting hook, e.g. its height from the floor, or with its orientation, or with a factor affecting its functioning, e.g. its load.

I claim:

1. A control system for controlling an installation having an operating member which is movable along several discrete axes, one at least of which is horizontal, said control system incorporating a control box for selecting control signals to be passed to the installation being controlled, a junction box for receiving control signals from the control box and sending these signals to the installation being controlled, and a flexible connecting cable for suspending the control box from the junction box, said control box comprising:

for each axis of movement of the operating member, two differently marked control members each of which is manually operable to cause displacement of the operating member in a respective direction along that axis: and a direction indicating mechanism for providing a visible indication of the horizontal position of the operating member irrespective of the position of the control box, said indicating mechanism having a reference element which is movable relative to the control box, a visible element movably associated with said reference element and connection means associated with the junction box for restraining the reference element from rotation relative to the junction box, whereby the operator may gain the same perspective of the position of the operating member at a point in time by viewing either the operating member or the direction indicating mechanism.

2. A control system according to claim 1 wherein the connection means comprises a flexible non-twist cable fitted in a sheath housed in the connecting cable, one end of said cable being mounted against rotation within the junction box and the other end of said cable being fixedly connected to the reference element.

3. A control system according to claim 1 wherein the visible element comprises a substantially horizontal rotatable disc mounted within the control box, which disc is connected to the reference element and carries on its upper surface, which is visible at least in part from the exterior of the control box, a mark allotted to the or each horizontal axis of movement of the operating member, each mark corresponding to a respective one of the differently marked control members that relate to this axis, the relative position of the mark informing the operator of the direction of movement of the operating member which would occur if he were to operate that control member.

4. A control system according to claim 3 wherein the disc also carries on its upper surface a diagrammatic general picture of the installation being controlled so as to provide a reminder of the position of the installation relative to the operator.

5. A control system according to claim 1, wherein the connecting cable encloses, within a flexible sleeve, a set of conductors for transmitting control signals from the control box to the junction box, and a supporting cable connecting the control box to the junction box to carry the main weight of the control box.

6. A control system according to claim 1 wherein the control box consists of a casing provided with a number of said control members and with a hand grip secured to the lower portion of the casng, at least some of said control members being mounted on the casing and grouped in a fan-like arrangement around the grip to enable them to be actuated by the thumb of the operator holding the grip.

7. A control system according to claim 6 wherein the grip is of elongate form and is secured on a shaft which is adapted, in use, to be inclined to the horizontal at an angle of betwee 0° and 80°.

8. A control system as claimed in claim 7 wherein the shaft is adapted to be inclined to the horizontal at an angle of substantially 40°.

9. A control system according to claim 7 wherein the grip is adapted to rotate about its shaft.

10. A control system according to claim 6 wherein the casing has the general form of an inverted inclined truncated pyramid, the wider end of which is adapted, in use, to be horizontal and delimits the upper portion of the casing, and at least some of the control members being arranged on the side faces of the truncated pyramid.

11.

A control system according to claim 10, wherein the wider end of the truncated pyramid carries a round transparent cover through which the visible element may be seen.

12. A control system according to claim 6 wherein the two control members allotted to each of the axes of movement of the operating member are connected to each other to form a single control member adapted to be moved upwards or downwards on either side of a neutral position, in dependence upon the required direction of movement of the operating member along the appropriate axis.

13. A control system according to claim 1 wherein the control box comprises means for displaying a variable quantity indicative of a property of the operating member.

* * * * *